Patented May 15, 1951

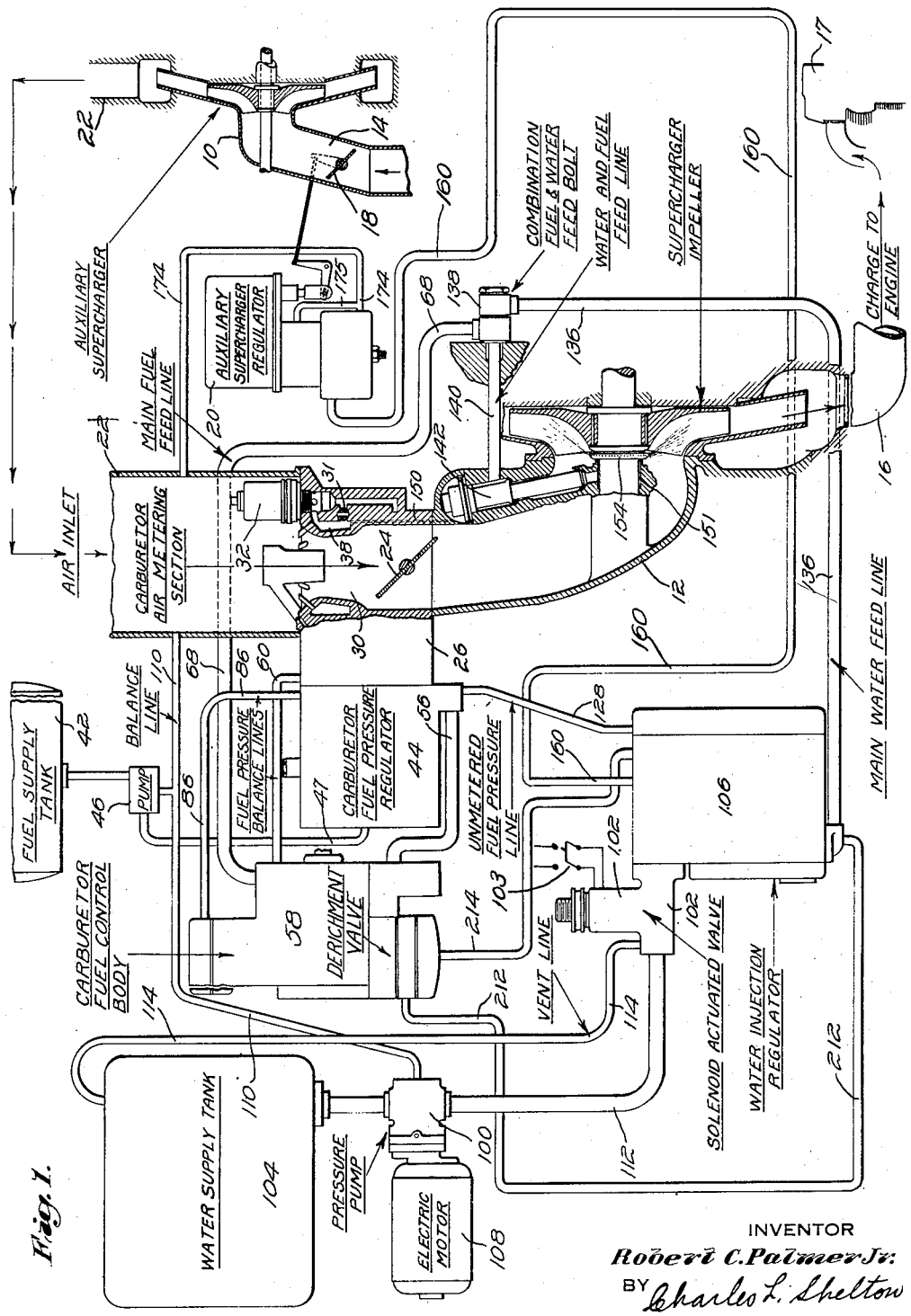

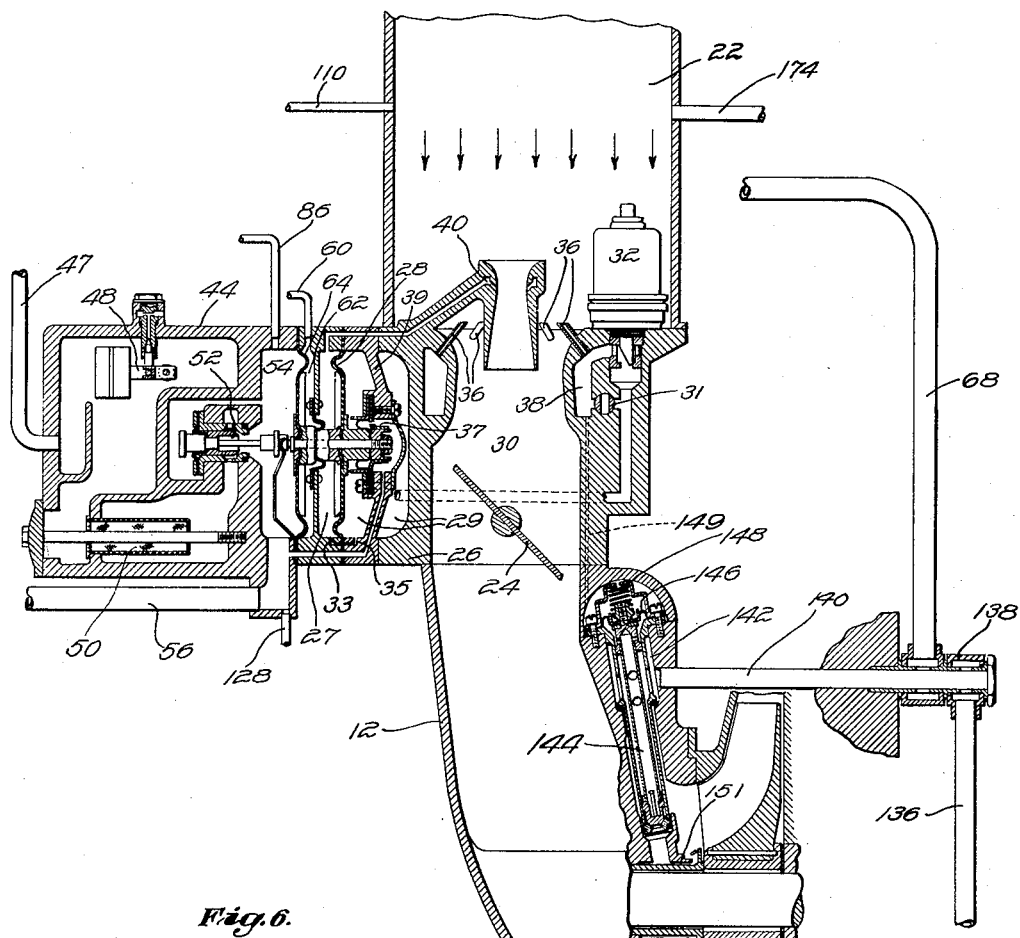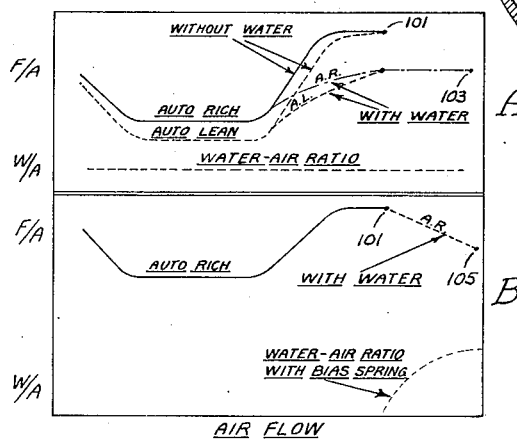

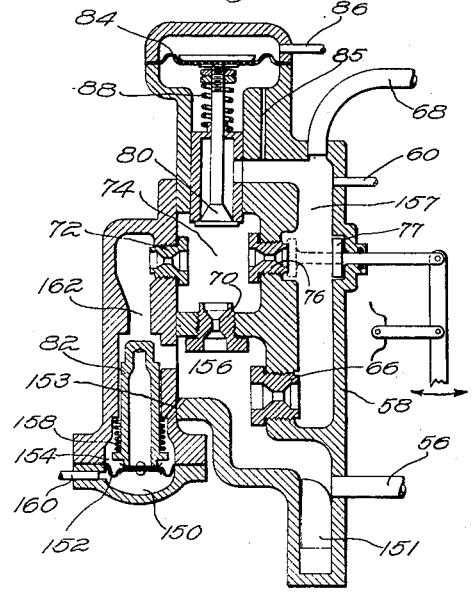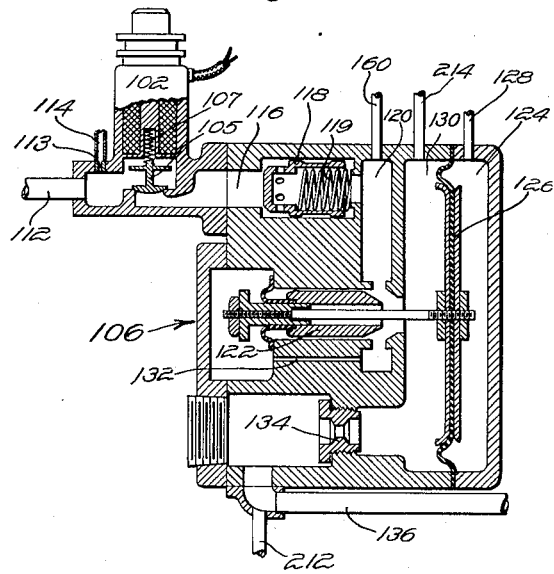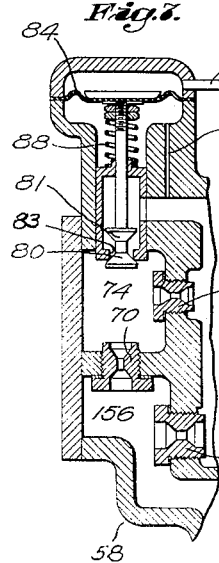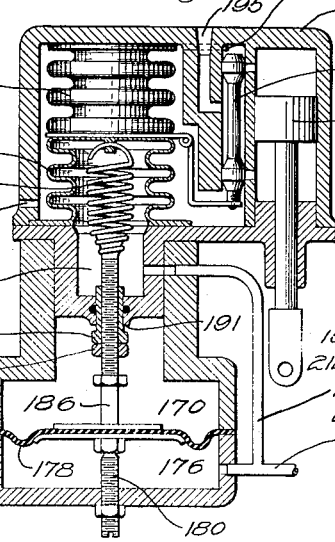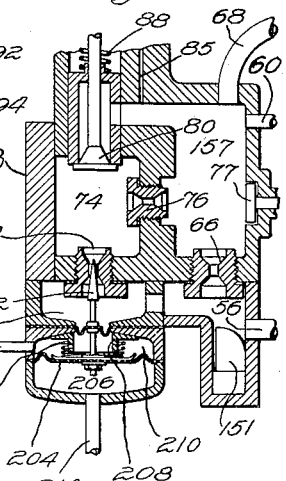

2,553,145

UNITED STATES PATENT OFFICE 2,553,145

WATER INJECTION APPARATUS

Robert C. Palmer, Jr., West Hartford, Conn., assignor to United Aircraft Corporation, East Hartford, Conn., a corporation of Delaware Application April 1, 1944, Serial No. 529,104

17 Claims. (Cl. 123—25)

This invention relates to a method and an apparatus for operating an internal combustion engine utilizing an internal coolant or anti-detonate substance, such as water.

An object of this invention is to provide improvements in engine charge forming apparatus of the type which supplies a combustion controlling ingredient to the engine charge.

A further object of this invention is to provide a means for forming multiple charges, having respectively different compositions, for an engine combustion chamber and for automatically adjusting or re-setting the various engine regulating or control devices to different control conditions to accord with differences in the nature of the combustion of said different charges.

Other objects and advantages will be apparent from the specification and claims, and from the accompanying drawing which illustrates what is now considered to be a preferred embodiment of the invention.

Fig. 1 is a diagrammatic lay-out of an apparatus for injecting either a charge of fuel and air or a charge of fuel, air, and a combustion modifying ingredient into the intake system of an internal combustion engine, with means for resetting the engine fuel-air ratio control and the engine power output control to different values when the engine is operated with one or the other of said charges.

Fig. 2 is a cross-sectional view on an enlarged scale of the supercharger, the carburetor air section and carburetor fuel section of Fig. 1.

Fig. 3 is a cross-sectional view on an enlarged scale of a portion of the carburetor fuel control body of Fig. 1.

Fig. 4 is a cross-sectional view on an enlarged scale of the ingredient regulator of Fig. 1.

Fig. 5 is a cross-sectional view on an enlarged scale of the supercharger regulator of Fig. 1.

Fig. 6 is a diagrammatic view graphically showing two of the various methods of engine operation that may be provided by this invention.

Fig. 7 is a cross-sectional partial view of a modification of the fuel control body.

Fig. 8 is a cross-sectional view of another modification of the fuel control body.

According to this invention, a combustion modifying ingredient, such as an anti-detonate substance or internal coolant, is added to the fuel-air charge of an internal combustion engine. The ingredient may be selectively added intermittently during engine operation, or added continuously, or automatically added within certain predetermined portions of the engine operating range. Thus, the engine may be operated at different times with different charges. The engine regulating or control devices are automatically adjusted or reset to provide the desired engine operating characteristics to accord with the nature of the charge being utilized by the engine at a given time. While various ingredients or "secondary fluids" may be utilized, one of the preferred ingredients for use with this invention is water, which acts both as a charge coolant or internal coolant and as a detonation suppressor. The term "water" as used in the specification and claims is intended to include either pure water, water plus modifying substances, or substances having water as a material component thereof.

In the embodiment of this invention shown in the drawing, two different charges are provided; fuel and air, or fuel, water and air. Two of the engine regulating devices are adjusted to different settings for each of these two different charges; that is, the mixture control which is adjusted to change the fuel-air ratio, and the supercharger regulator which is adjusted to change the power output of the engine. Additional or other charges can be provided and additional or other regulating devices can be adjusted according to the teaching of this invention, the particular embodiment of the drawing being shown for the purpose of illustration only.

Referring to the drawing, a supercharger having an auxiliary stage 10 and a main stage 12 forces atmospheric air from the inlet 14 to induction pipes, one of which is illustrated at 16, leading to the cylinders of an internal combustion engine. The engine may be any one of numerous types well-known to the art and hence has not been specifically illustrated. For instance, the engine might be one of the well-known radial air-cooled aircraft engines having cylinders (one of which is partially shown at 17) arranged in one or more circumferential rows, each supplied with a charge through a pipe 16.

For regulating the maximum power output of the engine under varying conditions of altitude and engine operation, an auxiliary throttle 18 is automatically controlled by the supercharger regulator 20 so as to maintain the air pressure in the interstage ducting or manifold 22 at a substantially constant value, which may be varied by changing the setting or adjustment of the regulator 20. This automatic airflow control may be overridden by a manually actuated throttle 24 which controls the flow of air from the manifold 22 to the inlet of the main stage 12. When throttle 24 is fully open, the power output of the engine will be at a maximum determined by the pressure of the air in manifold 22 (neglecting temperature effects), and consequently will be limited in accordance with the setting of the regulator 20. When desired, the engine power output may be reduced below this maximum by partially closing throttle 24.

The intake airflow to the engine is measured by the carburetor air metering section 26. This device, known per se to the art, acts to establish an air pressure differential across a diaphragm 28 (Fig. 2) which is a function of the mass or weight rate of flow of air through the Venturi section 30. Altitude compensator 32 controls the pressure admitted to the diaphragm pressure chamber 29 from scoop chamber 38 in accordance with the temperature and pressure of the air in manifold 22, so that the pressure differential between the scoop chamber 38 and throat chamber 40 is corrected in accordance with variations in the density of the entering air before being transmitted to the air chambers 27, 29 on opposite sides of diaphragm 28, to maintain the pressure difference across this diaphragm always a function of the mass airflow rate through the manifold 22. Restricted bleeds 33, 35 provide for a very small flow of air from chamber 38 through the compensator valve past diaphragm 28 to chamber 40. A valve 31 may be manually opened to render the compensator 32 ineffective.

For proportioning the fuel flow to the airflow, a conventional carburetor fuel pressure regulator 44 is provided. The regulator is supplied through line 47 with fuel under substantially constant pressure by pump 46 fed from tank 42. Liquid fuel from pump 46, after passing through the vapor trap 48, is forced through a strainer 50 and then through the fuel flow regulating valve 52 into the unmetered fuel chamber 54. From this chamber the fuel is passed to the various metering jets of the fuel control body 58 (several forms of which are shown in Figs. 3, 7 and 8) by way of conduit 56. The metered fuel pressure on the low pressure or downstream side of the metering jets is applied through conduit 60 to the metered fuel pressure chamber 62, separated from the unmetered fuel pressure chamber 54 by a diaphragm 64.

Valve 52 is actuated by the compensated throat and scoop pressures in chambers 27 and 29 and the unmetered and metered fuel pressures in chambers 54 and 62 in a known manner to maintain the pressure drop across the various fuel metering orifices between the unmetered fuel pressure in line 56 and the metered fuel pressure in line 68 proportional to the pressure drop between the throat and scoop chambers 27, 29 of the air metering sections 26. The rate of flow by weight of fuel to the engine is thus maintained proportional to the rate of flow by weight of air to the engine by the air section 26, the fuel section 44 and the fuel control body 58, which together comprises a pressure type carburetor.

To vary the fuel-air ratio of the engine charge at different portions of the engine operating range the fuel control body 58 (Figs. 3, 7 and 8) is provided with a plurality of metering jets which are wholly or partially cut in or out of the fuel flow line to vary the ratio between the fuel and air, or the mixture strength, the rate of fuel flow being still held proportional to the rate of airflow while any particular jet condition or setting is maintained.

Fig. 3 shows fuel from conduit 56 passing through the main metering jet 66, which establishes the basic or normal fuel-air ratio or mixture strength. Under certain conditions of engine operation it is desirable to increase or vary this normal mixture strength and for this purpose the economizer jet 70, the "automatic rich" jet 76 and the economizer valve 80 are provided. Auto-rich jet 76 is manually opened and closed by a valve 77, while economizer valve 80 is automatically actuated by a diaphragm subjected to unmetered fuel pressure through line 86 from chamber 54 and metered fuel pressure from chamber 157 through passage 85. Reference is made to Fig. 8 for a more detailed showing of these valves. As the differential between unmetered and metered fuel pressures becomes greater the force exerted by these pressures on the diaphragm 84, when this differential reaches the higher portion of its range, will overcome the force exerted by spring 88 on valve 80 in a valve closing direction and will gradually open the valve to increase the fuel flow and gradually enrich the mixture as the engine power output increases over the higher portion of the power output range. Jet 76 is of greater flow restriction than jet 70 hence the flow through jet 70, chamber 74 and jet 76 will be mainly determined by the restriction of jet 76 when valve 77 is open and valve 80 is closed. When valve 80 is opened the flow through jet 70 will further increase to enrich the mixture to a ratio greater than the ratio provided by jet 76. Thus, economizer jet 70 acts as a limiting jet which puts a maximum or ceiling on the total flow through the economizer valve, or through both jet 76 and the economizer valve, for a given fuel metering pressure differential. The amount of this maximum flow or maximum enrichment is controlled by a needle 202, which is moved in or out of the jet 70, to vary the restriction of this jet, by a diaphragm 204 and spring 203, specifically described below. Idle valve 151 may be linked to throttle 24 in a known manner so as to regulate the flow through conduit 56 when the engine is idling. In other portions of the engine operating range idle valve 151 is fully open, as shown.

The arrangement of Fig. 7 is like Fig. 3 with the exception that the needle valve 202 and its actuating mechanism is omitted and the maximum flow through economizer valve 80 is limited by a derichment valve 81 mounted on the economizer valve stem in a position opposed to the economizer valve. In this modification also the basic or normal mixture strength is determined by the main metering jet 66, and may be increased by opening valve 77 (see Fig. 8) to establish a supplemental fuel flow through the auto-rich jet 76. When the engine power is increased to the higher portion of its power range, the increased fuel metering pressure differential across diaphragm 84 will cause valve 80 to open and further enrich the mixture to a limit (when valve 80 is fully open) determined by the size of economizer jet 70. As the engine power output increases still further, diaphragm 84 will be forced farther downward, beyond full open position of the economizer valve, to move the derichment valve 81 into proximity with the seat 83 of the economizer valve, causing a gradual restriction of the fuel flow through the economizer valve and a decrease in mixture strength as the engine power further increases, beyond the point at which the valve 80 is fully open. By properly contouring and positioning derichment valve 81, this decrease in mixture strength may be made to follow a desired curve and may be even continued to a point in which the derichment valve 81 contacts seat 83 and closes off all flow through the economizer valve. Thus, the economizer valve may have two closed positions; one at low and intermediate values of the fuel metering differential, in which the flow is cut off by economizer valve 80 (held in closed position by spring 88), and one at extremely high values of the fuel metering differential, in which the flow is cut off by derichment valve 81. In between these two closed positions the fuel mixture strength will be first increased and then decreased according to a curve which may be selected by properly contouring the valves 80 and 81.

In the modification of Fig. 8, fuel from conduit 56 passes through the main metering jet 66 and is metered thereby, after which it passes to the engine through the fuel feed line 68. In the position shown, the mixture strength provided by jet 66 is enriched by fuel which passes through jets 70 and 72 to the chamber 74 and then through the "automatic rich" jet 76 to the fuel feed line 68. Jet 76 is smaller or has a greater degree of flow restriction than jets 70 and 72, hence when economizer valve 80 is closed the flow through jets 70, 72 and 76 to feed line 68 will be regulated mainly by jet 76.

The economizer valve (which is the same in Figs. 3 and 8) is subjected to unmetered fuel pressure by conduit 86 and metered fuel pressure by passage 85. As the engine power output increases, the differential between the unmetered and metered fuel pressures increases, and the force exerted by this pressure differential on diaphragm 84 will overcome the force exerted on the valve in a valve closing direction by spring 88 and the valve will gradually open to increase the fuel flow and enrich the mixture at the higher end of the power output range. Flow through jet 72 is controlled by derichment valve 82 and when this valve is open the limit to the enrichening action of the enconomizer valve and the auto-rich jet is determined by the restriction of jets 70 and 72, through which the fuel flows to economizer valve 80 and auto-rich jet 76. When derichment valve 82 is closed then the maximum fuel flow through jet 76 and economizer valve 80 will be determined by jet 70 only. Thus, the upper limit of mixture strength is determined by the sum of the fuel flows through the respective jets 66, 70 and 72 for a given fuel metering pressure differential when valve 82 is open; and when valve 82 is closed the mixture strength will be limited to a lower maximum by jets 66 and 70. This modification is specifically claimed in the copending application of Samuel S. Fox, Serial No. 530,935, filed April 13, 1944, and assigned to applicant's assignee and now Patent Number 2,521,002, granted September 5, 1950.

The action of the several fuel metering devices of Figs. 3, 7 and 8 is diagrammatically shown, according to one mode of operation, in A and B of Fig. 6. Referring to diagram A (which relates mainly to Fig. 8), the mixture strength may vary either along an auto-rich curve or an auto-lean curve, depending upon whether or not the automatic rich jet 76 is opened or closed by valve 77. When the derichment valve 82 is open, the mixture strength follows one or the other of the curves marked "without water," up to an upper fuel-air ratio shown at 101, which represents the maximum mixture strength, provided when economizer valve 80 (Fig. 8) is fully open. This is usually also the point of maximum airflow or maximum power. When derichment valve 82 is closed, then the fuel-air ratio will follow a different curve, marked "with water" in the diagram A. In this instance, when the derichment valve 82 is closed, the airflow and power output are continued along the dotted line to a higher maximum power, at the point 103.

Diagram B (which relates mainly to Figs. 3 and 7) shows how the fuel-air ratio may be increased along the auto-rich curve until the economizer valve is fully open, at the point 101 of normal maximum power, and then may be gradually decreased along the dotted line marked "with water" as the needle 202 (Fig. 3) restricts the flow through economizer jet 70 or the derichment valve 81 (Fig. 7) restricts the flow through the economizer valve seat 83, until the engine reaches a higher maximum of power indicated at 105.

In Fig. 3 the flow capacity of the jet 70, which limits the maximum supplementary fuel flow through both jet 76 and valve 80, is varied by needle 202. In Fig. 8, two jets, 70 and 72, act to impose a limit on the fuel flow through jet 76 and valve 80, and jet 72 is controlled by valve 82. In Fig. 7 only the flow through the economized valve is controlled, by valves 80 and 81, and the capacity of the economizer jet 70 is not varied.

Water may also be supplied to the engine by starting pump 100 and closing switch 103 to energize solenoid valve 102 and lift valve head 105 against the force of spring 107, admitting water pumped from tank 104 to the water injection regulator 106. Pump 100, which is electrically driven by motor 108, may (like pump 46) be one of the pumps conventionally used in the art for supplying fuel to pressure carburetors, and is provided with a relief valve which acts to maintain the water pressure in line 112 at a substantially constant pressure above the pressure in the manifold 22, to which the pump relief valve is vented by conduit 110. Air bleed line 114 having a restriction 113 (Fig. 4) returns air and vapor from conduit 112 to the water tank 104.

When the solenoid valve is open water under pressure from line 112 is admitted to chamber 116 of the water injection regulator 106 (Fig. 4). Pressure in chamber 116 opens check valve 118 against spring 119 and admits the water under pressure to chamber 120, which is the inlet chamber to the pressure regulating valve 122 of the water regulator. Valve 122, before water is admitted to chamber 120, will be in its wide open position, as shown, because the pressure maintained in chamber 124 on one side of the valve actuating diaphragm 126 by the conduit 128, which is connected to the unmetered fuel chamber 54 of the fuel regulator 44, will be greater than the water pressure in chamber 130 on the other side of the valve actuating diaphragm except when solenoid valve 102 is open and water is flowing. When water is not flowing the pressure in chambers 130 and 120 will be equal to the metered fuel pressure in lines 136 and 68. As water passes into chambers 120, 130, the water pressure in chamber 130 will increase and will be regulated by valve 122 until it substantially equals the unmetered fuel pressure in chamber 124. Valve 122 is of the balanced type (a balancing passage 132 may be provided for this purpose) and is actuated solely by the forces applied to diaphragm 126 by the fluid pressures in chambers 124 and 130. If the pressure in chamber 130 slightly or momentarily exceeds the pressure in chamber 124, valve 122 will be moved in a closing direction to restrict or reduce the flow of water to chamber 130, while if the pressure in chamber 124 exceeds the pressure in chamber 130 the valve will be moved in an opening direction. As a result of this action, valve 122 will regulate the flow of water from inlet chamber 120 to chamber 130 so as to maintain the water pressure in chamber 130 substantially equal to the unmetered fuel pressure in chamber 124, whenever water is flowing to the engine. Water from chamber 130, which is the unmetered water chamber, passes through the water metering jet 134 to the water feed line 136. Line 136 is connected to the fuel feed line 68 by a combined fuel and water connection 138, hence, the metered water pressure on the downstream side or the lower pressure side of the water metering jet 134 will always be equal to the metered fuel pressure on the downstream or lower pressure side of the fuel metering jets in the fuel control body 58. The unmetered water pressure in chamber 130 is maintained equal to the unmetered fuel pressure in chamber 124 by the valve 122, in the manner explained above. Therefore, the water metering pressure differential across jet 134 is maintained proportional to the fuel metering pressure differential, which in turn is a function of the rate of flow by weight of intake air. The flow through the water metering jet 134 is a function of the pressure difference across this orifice, hence the rate of flow by weight of water fed to the engine is proportioned to the rate of flow by weight of engine intake air. If desired, valve 122 may be spring biased to a closed position in a manner similar to the biasing of valve 89 by spring 88, so that valve 122 will be automatically opened by the spring only at higher values of the fuel metering pressure differential.

The water regulator of Fig. 4 will maintain a constant water-air ratio, as shown in Fig. 6, diagram A. Variations in the fuel-air ratio, effected by opening or closing the various fuel jets, will not affect the water-air ratio because the water metering pressure differential is maintained equal to the fuel metering pressure differential, which is regulated as a function of mass airflow, independently of the operation of the fuel metering jets. If the valve 122 is spring biased then no water will be introduced until the airflow reaches a predetermined value, as shown in diagram B of Fig. 6. The water-air ratio will then follow a curve, such as shown in the diagram, and both the point of initiation of water flow (assuming water is being supplied to the regulator) and the shape of the water-air curve may be varied by changing the force and the characteristics of the biasing spring.

Water and fuel from the feed lines 68 and 136 are mechanically mixed in the combined feed line 140 and the fuel discharge nozzle 142. The discharge nozzle comprises a valve member 144 actuated by a diaphragm 146 subjected on one side to the force of spring 148 and to the scoop pressure of the air passing through the venturi, which is admitted to one side of the diaphragm by a passage 149. The other side of diaphragm 146 is subjected to the pressure of the fuel, or of the fuel and water, admitted to the discharge valve by conduit 140. This nozzle discharges the fuel or the fuel and water into the annular passage 151 and the annular spinner cup 154 at a pressure which is maintained at a constant value, determined by the force of spring 148, above the Venturi scoop pressure. The metered fuel and metered water pressures are thus held at a common substantially constant discharge pressure, with reference to the pressure of the intake air.

The fuel control bodies of Figs. 3, 7 and 8 each operate to establish a conventional fuel-air ratio curve, when water is not being injected. Needle 202 of Fig. 3 will be held clear of jet 70 by spring 203 and by the unmetered fuel pressure in chamber 156 acting on the small diaphragm between chambers 156, 210. In the operation of the modification of Fig. 7, the engine power output is limited so that the fuel metering pressure differential will not reach a sufficiently high value to move valve 81 far enough to restrict the flow through seat 83. Derichment valve 82 in Fig. 8 will be held open by spring 158 and by the unmetered fuel pressure admitted to chamber 154 and diaphragm 152 by passage 153. When the modification of Fig. 7 is used, the openings for conduits 212, 214 in regulator 106 are plugged. When the modification of Fig. 8 is used, these openings are plugged and a branch line is provided connecting conduit 160 with the derichment valve chamber 150.

As soon as a flow of water to the engine begins, a pressure drop is created across water jet 134. Referring to Fig. 3, this drop is applied across the large diaphragm 204 of the fuel control body 58 by the unmetered water pressure conduit 214, connecting chamber 130 of the water regulator with chamber 206 of the fuel control body, and by the metered water pressure conduit 212, connecting water line 136 with chamber 210 of the fuel control body. When the water metering pressure drop becomes sufficiently high, the force exerted on the diaphragm 204 in an upward direction will overcome the force exerted downwardly on the diaphragm by spring 203, and needle 202 will be moved into the jet 70 to gradually increase the restriction of this jet, or decrease the fuel flow capacity thereof, to a lower maximum or limit determined by the position of the diaphragm stop 208. Consequently, the fuel-air ratio will decrease as the water metering pressure differential increases, as shown by the line between 101 and 105 in diagram B of Fig. 6. This line need not be straight but may be varied in shape, for example by varying the characteristics of spring 203 or the contour of needle 202.

When the modification of Fig. 7 is used, no direct connection between the fuel control body and the water regulator need be provided. The fuel control body alone will reduce the fuel-air ratio when the derichment valve 81 is moved far enough to restrict the flow through seat 83. This modification is particularly adapted for use in conjunction with the biasing spring for water valve 122; in such an arrangement, the water flow may be automatically begun concurrently with the reduction in mixture strength automatically effected at high power outputs by derichment valve 81.

Referring to Fig. 8, when valve 105 is open and water is being injected, then the water pressure in chamber 120 will become substantially equal to the water pump outlet pressure in conduit 112. When this modification is used conduit 160 is connected by a branch line to chamber 150 on the water side of derichment valve diaphragm 152, thus establishing inlet water pressure in chamber 150. This pressure is higher than the pressure in unmetered water chamber 130 and higher than the unmetered fuel pressure in chamber 124 of the water regulator and chambers 156 and 154 of the fuel control body. Hence there will be a force exerted by the differential pressures on opposed sides of diaphragm 152 tending to close valve 82 when water is being injected. Compression spring 158 is made sufficiently weak to enable this force to close valve 82, shutting off the passage 162 to the derichment jet 72 and stopping the fuel flow through jet 72 when the water flow is started through jet 134. Thus, when the flow of water to the engine is started, the maximum mixture strength is automatically set at a relatively lower limit, determined by jets 70 and 66.

As a further variation of the fuel control body, the economizer valve 80 may be entirely eliminated and the fuel control body constructed with only the main metering jet 66 and the auto-rich jet 76. With such an arrangement, when used in conjunction with water regulator 106, the supplementary fuel that would normally be provided by the economizer valve can be entirely replaced by the secondary liquid, or water. By biasing valve 122 of the regulator 106 to a closed position, as suggested above, this water can be added in the same manner as the supplementary fuel is normally added by the economizer valve, automatically over the higher portion of the power output range.

The supercharger regulator 20 (Figs. 1 and 5) is also adjusted or reset in accordance with the flow of water to the engine. Chamber 170 on the upper side of diaphragm 178 of the supercharger regulator 20 is connected to the inlet chamber 120 of the water regulator, by conduit 160. When water is injected, the pressure in conduit 160 immediately builds up in accordance with the build-up in pressure in the inlet chamber 120 of the regulator 106. This pressure is large enough, in relation to the area of diaphragm 178, to exert sufficient force on the stem 186 to force it down against the adjustable stop 180, increasing the bias or tension of spring 188 to reset the supercharger regulator so as to limit the pressure in manifold 22 to a higher maximum. The value of this increased pressure may be controlled by adjusting the position of stop 180.

When water is not flowing, the pressure in chambers 120 and 170 is equal to metered fuel pressure, which is greater than the pressure in manifold 22 but which is not sufficient to overcome the force exerted on the diaphragm 178 in an upward direction by the scoop pressure admitted to chamber 176 on the lower side of the diaphragm by conduit 174, connected to manifold 22, plus the force exerted on the bellows 182 by the pressure in chamber 184, which is connected to conduit 174 by branch line 175, and the force exerted upwardly on the stem 186 by the spring 188. The diaphragm will assume its upward position, in which nut 190 bears against stop flange 191. As shown in Fig. 5, diaphragm 178 is in its downward position.

Bellows 182 is subjected on its inside to the pressure in manifold 22 and will actuate servovalve 192 and control servo-motor 194 so as to open and close auxiliary throttle 18 to maintain the pressure in the inter-stage ducting or manifold 22 at a substantially constant value, which is determined by the tension of spring 188 and therefore, is determined by the setting of the adjustable nut 190 (which may be locked in position by nut 193) when the diaphragm is in its upper position and by the setting of stop 180 when the diaphragm is in its lower position. Bellows 182 is backed on one side by an evacuated bellows 196. The servo-motor 194 is actuated by oil supplied under pressure by an oil pump (not shown) to port 195 and admitted to one or the other side of the servo-piston by servovalve 192. Port 185 drains leakage oil from the bellows chamber and may be connected to the engine crankcase. Port 197 vents the upper side of the servo-valve to the bellows chamber.

The power output of the engine may be controlled by regulating the charge pressure, up to a predetermined maximum limited by the pressure in manifold 22. By automatically resetting the apparatus which governs this manifold pressure, the maximum power output of the engine is automatically increased when water is being injected. The regulator 20, or a like device, may also control the engine power output in other ways than by varying the position of throttle 18, for instance in a known manner by regulating the waste gate of a turbo-supercharger driven by the engine exhaust gases and driving auxiliary supercharger stage 10, or by varying the auxiliary supercharger speed, as disclosed in the Hobbs-Willgoos application Serial No. 492,423, filed June 26, 1943, and assigned to applicant's assignee, and now Patent No. 2,400,307, granted May 14, 1946.

*Operation*

The water supply pump is turned on and maintains operating water pressure at the water inlet of the solenoid valve 102. Any air in the water supply line is eliminated through the bleed line 114 at the solenoid valve inlet. Switch 103 is closed, which opens the valve and admits water under pressure to the water regulator. Water starts to flow through the regulator to the fuel discharge valve and the pressure in the inlet chamber 120 of the regulator increases to the operating pressure, or the pressure maintained in line 112 by pump 100; and a pressure differential will build up across water jet 134. When the drop across jet 134 becomes sufficiently high the needle 202 (Fig. 3) will be moved to restrict the flow through jet 70, or the increase in pressure in chamber 120 will cause derichment valve 82 (Fig. 8) to close; causing the fuel-air ratio to decrease to the best power value, for instance, from .105 to .080, thereby increasing the power output of the engine. A like effect is produced, when the modification of Fig. 7 is used, by the derichment valve 81. The increase in pressure in inlet chamber 120 also resets the regulating pressure datum of the auxiliary supercharger, for instance, from 28″ Hg to 32″ Hg, which increases the mass airflow to the engine. The decrease in fuel mixture strengths and the increase in mass airflow change the maximum power output of the engine to a very high value. The water flow to the engine directly cools the charge, internally cools the combustion chamber and acts to prevent detonation so that the engine can safely produce this increased power.

High power output will be maintained as long as the switch 103 is held in the "on" position and a supply of water is available in the supply tank 104. When the switch 103 is turned off, the solenoid actuated valve 102 closes, causing the pressure in chamber 120 of the water injection regulator to suddenly decrease. This decrease in pressure stops the water flow to the engine, opens the derichment valve (Fig. 3 or Fig. 8) on the carburetor, returning the fuel mixture strengths to their normal values, and decreases the pressure regulating datum of the supercharger regulator to the normal operating value, thereby decreasing the mass airflow to the engine to a relatively low maximum power output. In the case of Fig. 7, this decrease in airflow also may act to change the pressure drop across diaphragm 84, causing valve 81 to move away from seat 83.

If at any time during relatively higher maximum power operation the water supply is exhausted, the operating water pressure in chamber 120 of the water injection regulator and the pressure drop across water jet 134 will decrease in the same manner as though the solenoid actuated valve 102 were closed, and the engine power, the fuel mixture strengths, and the mass airflow will change to their lower maximum power settings. The electrically driven pressure pump 100 is preferably operated the entire time that high maximum power may be required, and the solenoid valve opened to obtain such high power when required; or, if preferred, the valve 122 may be spring biased to open automatically only when the mass airflow (and consequently the fuel metering pressure differential) exceeds a predetermined value.

If desired, the ingredient or the fuel or the ingredient and the fuel may be directly injected into the engine combustion chamber or chambers, rather than into the supercharger as shown in the embodiment of the drawing.

It is to be understood that the invention is not limited to the specific embodiment herein illustrated and described, but may be used in other ways without departure from its spirit as defined by the following claims.

I claim:

1. In an internal combustion engine charging apparatus, a fuel flow regulating device, an ingredient flow regulating device, and means for regulating the operation of each of said devices by the other of said devices.

2. In an internal combustion engine charging apparatus, separate airflow, fuel flow, and combustion modifying ingredient flow controlling devices, and means for regulating each of said devices by another of said devices.

3. In an internally water cooled and externally air-cooled engine, an airflow controlling device for limiting the maximum quantity of air supplied to said engine, water flow controlling means for varying the quantity of water supplied to said engine, means for maintaining the quantity of water supplied in proportion to the quantity of air supplied, and means for regulating said airflow controlling device by said water flow controlling means.

4. In an engine fuel supply system, means for supplying air to said engine, means for supplying water to said engine in predetermined ratio to the quantity of air supplied, means for supplying fuel to said engine in predetermined ratio to the quantity of air supplied, means for varying the ratio of fuel to air in response to variations in the quantity of air supplied, and means for varying the ratio of fuel to air in accordance with variations in the quantity of water supplied.

5. In an apparatus for charging an internal combustion engine, means effective during engine operation to create a fuel-air mixture having predetermined proportions by weight of fuel to air throughout the engine operating range, means including a valve for adding a combustion modifying ingredient to said fuel-air mixture, and means automatically effective upon an operation of said valve to alter the proportions of fuel to air in said mixture when said ingredient is being added thereto.

6. An ingredient injection apparatus for an internal combustion engine comprising, means responsive to variations in the pressure of the fuel flowing to said engine for regulating the quantity of a combustion modifying ingredient flowing to said engine, and means responsive to variations in the pressure of said ingredient flowing to said engine for changing the rate of fuel flow to said engine in relation to the rate of air flow to said engine.

7. In an engine having a combustion chamber, means for supplying fuel and air to said chamber in predetermined ratio during engine operation, means for supplying water to said chamber in predetermined ratio to said air, and means for changing said fuel-air ratio by a predetermined amount in response to a change in said water-air ratio.

8. In a water injection apparatus for an aircraft engine having a pressure type carburetor including a mixture strength control having at least one fuel metering jet and means responsive to variations in both intake airflow and fuel flow for maintaining a fuel metering pressure differential across said fuel jet which is a function of the rate of flow by weight of intake air, a water metering jet, means including a manually operated valve for establishing a flow of water through said water jet, means responsive to variations in both said intake airflow and said water flow for maintaining a water metering pressure differential across said water jet which is equal to said fuel metering pressure differential, and means responsive to variations in the water pressure on one side of said water jet with respect to the water pressure on the other side of said water jet for varying the operation of said mixture strength control means to increase the power output of said engine when water is flowing to said engine.

9. In combination, a charge forming device or carburetor having fuel metering means including a jet or port constituting when open part of the normal metering system and when closed functioning to reduce the richness of the primary fuel charge, a derichment valve coacting with said jet, an auxiliary charge injection system for supplying an auxiliary charge component such as an antidetonant fluid to the engine including a metering valve for the antidetonant fluid, pressure responsive means connected to said valve, means for subjecting said latter means to a pressure varying with variations in engine power to initiate metering of said fluid at a predetermined point in the power range, means maintaining said derichment valve open during engine operation when primary fuel only is being supplied to the engine, means responsive to a pressure varying with variations in engine power for closing said derichment valve when antidetonant fluid is to be supplied, and means for timing the admission of operating pressure to said derichment valve in relation to the time of injection of said fluid.

10. In an apparatus for charging an internal combustion engine with a combustible mixture of fuel and air and a third combustion modifying ingredient, a fuel control body having a pair of jets for limiting the strength of said mixture to a predetermined maximum, and means subjected to the pressure of said third ingredient for controlling the flow of fuel through one of said jets.

11. In combination with a pressure type carburetor including a fuel control body having at least two flow restricting passages for limiting the fuel-air ratio of the charge provided by said carburetor to a predetermined maximum, a regulator operatively associated with said carburetor for governing the flow of a third combustion modifying ingredient to the combustible mixture formed by said carburetor, and means operatively associated with said regulator for controlling the flow of fuel through at least one of said restricted passages.

12. In an internal combustion engine, means for feeding charging air to said engine, means for feeding fuel to said engine, means for feeding a combustion modifying ingredient to said engine, a fuel control body having a pair of jets for limiting the flow of said fuel to maintain a predetermined maximum ratio of the flow of said fuel to the flow of said charging air, and means subjected to the fluid pressure of said ingredient for controlling the flow of fuel through one of said jets.

13. In an apparatus for charging an internal combustion engine, a carburetor fuel pressure regulator and fuel control body effective during engine operation to create a fuel-air mixture having predetermined proportions by weight of fuel to air throughout the engine operating range, a combustion modifying ingredient regulator including a valve for adding a combustion modifying ingredient to said fuel-air mixture, and means including a derichment valve automatically effective upon operation of said first named valve to alter the proportions of fuel to air in said mixture when said ingredient is being added thereto.

14. An ingredient injection apparatus for an internal combustion engine comprising, a combustion modifying ingredient regulator having a valve responsive to variations in the pressure of the fuel flowing through said engine for regulating the quantity of the combustion modifying ingredient flowing to said engine, and means including a derichment valve responsive to variations in the pressure of said ingredient flowing to said engine for changing the rate of fuel flow to said engine in relation to the rate of air flow to said engine.

15. In an engine having a combustion chamber, carburetor means for supplying fuel and air to said chamber in predetermined ratio during engine operation, a water regulator for supplying water to said chamber in predetermined ratio to said air, and means including a fuel derichment valve for changing said fuel-air ratio by a predetermined amount in response to a change in said water-air ratio.

16. In an internal combustion engine charging apparatus, a fuel flow regulating device having a fuel derichment valve, an ingredient flow regulating device having a valve for regulating the flow of a combustion modifying ingredient, means for regulating the fuel derichment valve of the fuel flow regulating device by the ingredient flow regulating device and means for regulating the valve of the ingredient flow regulating device by the fuel flow regulating device.

17. In an apparatus for charging an internal combustion engine, a carburetor fuel pressure regulator and fuel control body effective during engine operation to create a fuel-air mixture having predetermined proportions by weight of fuel to air throughout the engine operating range, said fuel control body having a pair of jets for limiting the strength of said mixture to a predetermined maximum, a combustion modifying ingredient regulator including a valve for adding a combustion modifying ingredient to said fuel-air mixture, and means including a derichment valve automatically effective upon operation of said first named valve to alter the proportions of fuel to air in said mixture when said ingredient being added thereto by changing the flow through one of said jets.

ROBERT C. PALMER, Jr.

REFERENCES CITED

The following references are of record in the file of this patent:

UNITED STATES PATENTS

| Number | Name | Date |
|---|---|---|
| 1,338,993 | McNeel | May 4, 1920 |
| 2,076,606 | Winter | Apr. 13, 1937 |
| 2,330,650 | Weiche | Sept. 28, 1943 |
| Re. 22,447 | Hersey et al. | Feb. 29, 1944 |
| 2,348,008 | Hunt | May 2, 1944 |
| 2,361,227 | Mock | Oct. 24, 1944 |
| 2,392,565 | Anderson et al. | Jan. 8, 1946 |
| 2,482,040 | Thorns et al. | Sept. 13, 1949 |

FOREIGN PATENTS

| Number | Country | Date |
|---|---|---|
| 828,458 | France | May 18, 1938 |